United States Patent
Liu et al.

(10) Patent No.: US 10,324,645 B2
(45) Date of Patent: Jun. 18, 2019

(54) DATA STORAGE DEVICE AND DATA STORAGE METHOD THEREOF

(71) Applicant: Silicon Motion, Inc., Jhubei, Hsinchu (TW)

(72) Inventors: Tsai-Fa Liu, New Taipei (TW); Hung-Lian Lien, Taipei (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

(21) Appl. No.: 15/472,270

(22) Filed: Mar. 29, 2017

(65) Prior Publication Data

US 2017/0371577 A1  Dec. 28, 2017

Related U.S. Application Data

(60) Provisional application No. 62/353,570, filed on Jun. 23, 2016.

(51) Int. Cl.

| | |
|---|---|
| *G06F 11/30* | (2006.01) |
| *G06F 3/06* | (2006.01) |
| *G06F 12/02* | (2006.01) |
| *G06F 12/0802* | (2016.01) |
| *G06F 1/28* | (2006.01) |

(52) U.S. Cl.
CPC .............. *G06F 3/0634* (2013.01); *G06F 1/28* (2013.01); *G06F 3/0616* (2013.01); *G06F 3/0617* (2013.01); *G06F 3/0619* (2013.01); *G06F 3/0652* (2013.01); *G06F 3/0656* (2013.01); *G06F 3/0679* (2013.01); *G06F 3/0685* (2013.01); *G06F 12/0238* (2013.01); *G06F 12/0253* (2013.01); *G06F 12/0802* (2013.01); *G06F 3/0653* (2013.01); *G06F 2212/1032* (2013.01); *G06F 2212/60* (2013.01); *G06F 2212/7204* (2013.01)

(58) Field of Classification Search
CPC .... G06F 3/0634; G06F 3/0616; G06F 3/0652; G06F 3/0653; G06F 3/0685; G06F 12/0802; G06F 12/0253
USPC ........................................................ 365/228
See application file for complete search history.

(56) References Cited

U.S. PATENT DOCUMENTS

| | | | |
|---|---|---|---|
| 5,608,684 A * | 3/1997 | Reasoner ............... | G11C 5/141 365/149 |
| 8,958,260 B2 * | 2/2015 | Resnick ........... | G01R 19/16552 365/189.07 |

(Continued)

OTHER PUBLICATIONS

Office Action issued by Taiwan Intellectual Property Office dated May 16, 2017.

*Primary Examiner* — Xiaochun L Chen
(74) *Attorney, Agent, or Firm* — WPAT, PC

(57) ABSTRACT

A data storage method for a data storage device is provided. The data storage method includes steps of: determining whether a power drop/loss event occurs; when the power drop/loss event is determined to have occurred, recording a voltage level of a charge storage device, wherein the charge storage device provides power to the data storage device during the power drop/loss event; determining whether the charge storage device is operating normally according to the recorded voltage level of the charge storage device; and when the charge storage device is determined to be not operating normally, configuring the data storage device to enter a safe operation mode. A data storage device is also provided.

4 Claims, 5 Drawing Sheets

(56) References Cited

U.S. PATENT DOCUMENTS

| | | | |
|---|---|---|---|
| 9,141,505 B1* | 9/2015 | Crow | G06F 11/3058 |
| 9,563,249 B2* | 2/2017 | Lin | G06F 1/30 |
| 9,632,562 B2* | 4/2017 | Quach | G06F 1/3275 |
| 9,753,828 B1* | 9/2017 | Crow | G06F 11/3058 |
| 9,846,468 B2* | 12/2017 | Amidi | G06F 11/1662 |
| 2002/0003740 A1* | 1/2002 | Chang | G06F 1/26 |
| | | | 365/226 |
| 2005/0033878 A1 | 2/2005 | Pangal et al. | |
| 2006/0059385 A1* | 3/2006 | Atri | G06F 11/1441 |
| | | | 714/14 |
| 2007/0002668 A1* | 1/2007 | Williams | G06F 13/1684 |
| | | | 365/230.06 |
| 2008/0091899 A1* | 4/2008 | Innan | G06F 3/0607 |
| | | | 711/162 |
| 2012/0153966 A1* | 6/2012 | Kawamura | G01R 31/028 |
| | | | 324/548 |
| 2013/0188430 A1* | 7/2013 | Resnick | G01R 19/16552 |
| | | | 365/189.07 |
| 2015/0378415 A1* | 12/2015 | George | G06F 1/30 |
| | | | 307/64 |
| 2016/0148670 A1* | 5/2016 | Quach | G06F 1/3275 |
| | | | 713/323 |
| 2016/0224089 A1* | 8/2016 | Lin | G06F 1/30 |
| 2016/0378621 A1* | 12/2016 | Amidi | G06F 11/1662 |
| | | | 714/6.2 |
| 2017/0091042 A1* | 3/2017 | Chou | G06F 11/1415 |

* cited by examiner

DATA STORAGE DEVICE AND DATA STORAGE METHOD THEREOF

FIELD OF THE INVENTION

The present invention relates to a technique for data storage, and more particularly to a data storage device and a data storage method thereof.

BACKGROUND OF THE INVENTION

A general data storage device mainly includes a control unit, a voltage pull-down module, a volatile memory and a non-volatile memory. The control unit is electrically coupled to a host (such as a computer or a handheld mobile device) and configured to communicate and transmit data with the host. In the operation of the conventional data storage device, the control unit receives and processes commands from the host, writes the target data into the non-volatile memory, or reads the target data from the non-volatile memory. If the data transmitted from the host has a relatively small data amount (e.g., smaller than one page), the control unit may first store the received data into the volatile memory or data buffers and then move the data to the non-volatile memory from the volatile memory or the data buffers when the data is accumulated to a certain amount (e.g., equal to or larger than one page). Besides the data transmitted between the control unit and the host, the control unit also stores the data required for its operation, such as the address mapping table, into the volatile memory.

In general, the voltage pull-down module is configured to convert external power provided by the host into a plurality of low voltages with different voltage levels. The low voltages are then provided to the control unit, the volatile memory and the non-volatile memory as the respective operating voltages. However, the data storage device may have a power drop/loss event in operation. In order to avoid improper operation of the data storage device due to a power drop/loss event, some manufacturers add a charge storage device (or capacitor) into the data storage device as a small spare power supply. Therefore, when a power drop/loss event occurs, the charge storage device can briefly provide power to enable the data storage device to successfully complete the specified task.

However, in general, the charge storage device has a problem in lifetime. That is, when the lifetime of the charge storage device expires or the charge storage device is out of order, the charge storage device will not have expected function unless the user replaces the charge storage device or performs troubleshooting. However, currently there is no appropriate processing mechanism to handle the event such as the lifetime of the charge storage device has expired or the charge storage device is damaged.

In addition, the data storage device also requires a protection mechanism to protect data stored in volatile memory, such as dynamic random access memory (DRAM) or data buffers, when a power drop/loss event occurs.

SUMMARY OF THE INVENTION

One objective of the present invention is to provide a data storage method for a data storage device, in which the data to be written is ensured not to be lost when a charge storage device of the data storage device cannot operate normally.

Another objective of the present invention is to provide a data storage method for a data storage device, in which a host supplying power to the data storage device will not be force shutdown when the data storage device is in a busy state.

Still another objective of the present invention is to provide a data storage device, in which the data to be written is ensured not to be lost when a charge storage device of the data storage device cannot operate normally.

The present invention provides a data storage method for a data storage device, which includes steps of: determining whether a power drop/loss event occurs; when the power drop/loss event is determined to have occurred, recording a voltage level of a charge storage device, wherein the charge storage device provides power to the data storage device during the power drop/loss event; determining whether the charge storage device is operating normally according to the recorded voltage level of the charge storage device; and when the charge storage device is determined to be not operating normally, configuring the data storage device to enter a safe operation mode.

The present invention further provides a data storage method for a data storage device, which includes steps of: determining whether an interrupt message is received from a host, wherein the interrupt message is transmitted when a power switch of the host is switched on; when the interrupt message is determined to have been received, determining whether the data storage device is in a busy state; and when the data storage device is determined to be in the busy state, configuring the data storage device to transmit the busy state to the host via a general purpose input/output (GPIO) pin.

The invention still further provides a data storage device, which includes a non-volatile data storage device, a volatile data storage device, a backup power supply and a controller. The non-volatile data storage device is for storing data permanently. The volatile data storage device is for storing data temporarily. The controller is for controlling the operation of the non-volatile data storage device and the volatile data storage device, detecting at least two voltage values of the backup power supply in a power drop/loss event, and determining whether to enter a safe operation mode based on the two voltage values after the power drop/loss event. The backup power supply provides power to the non-volatile data storage device, the volatile data storage device and the controller during the power drop/loss event.

By employing the aforementioned data storage method of the present invention, the data storage device can ensure that the data to be written into the data storage device is not lost when a power drop/loss event occurs, thereby ensuring the integrity and accuracy of the data to be written.

BRIEF DESCRIPTION OF THE DRAWINGS

Other advantages, objectives and features of the present invention will become apparent from the following description referring to the attached drawings.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
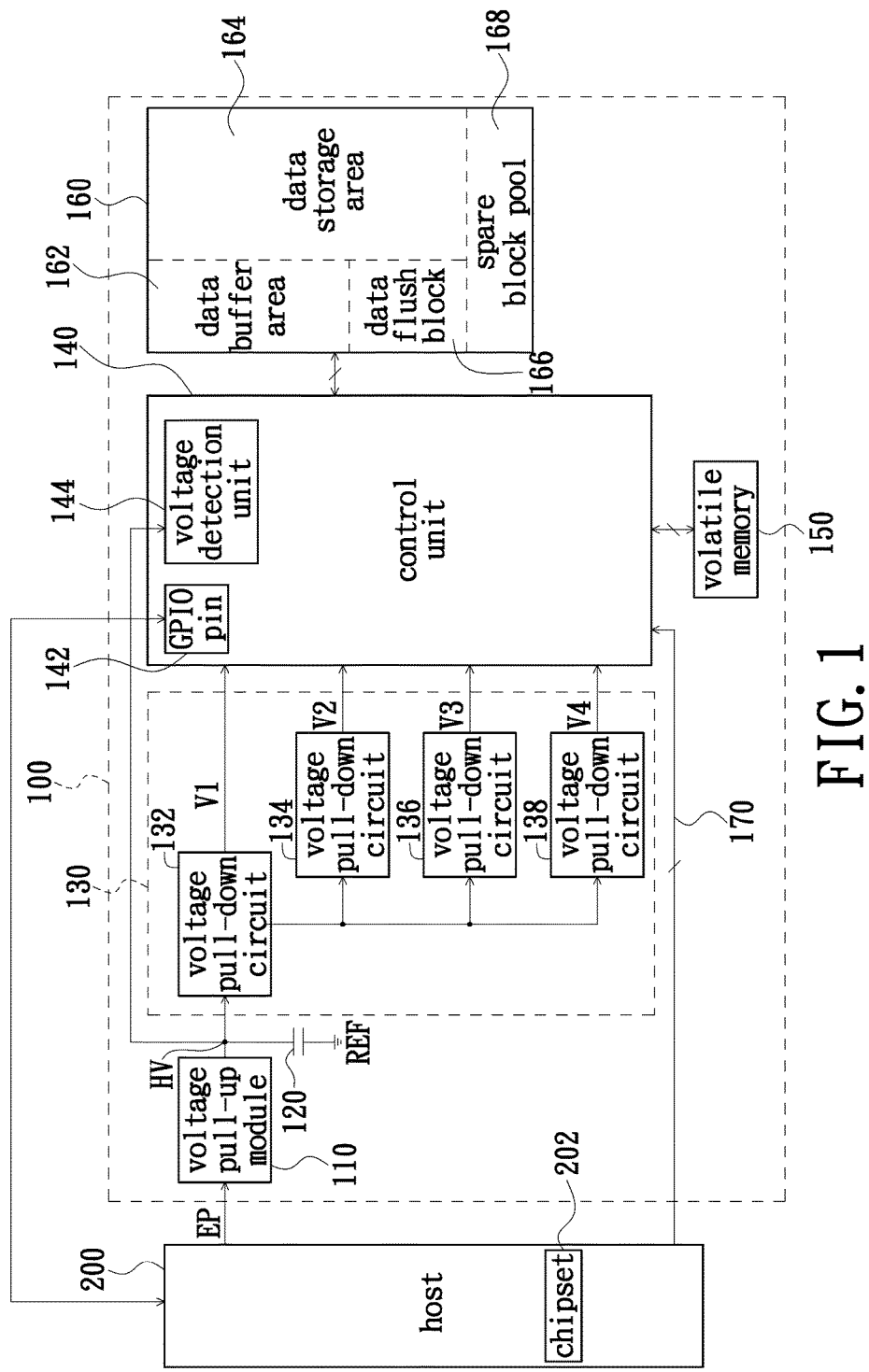
FIG. 1 is a schematic block view of a data storage device in accordance with an embodiment of the present invention.

FIG. 1 is a schematic block view of a data storage device in accordance with an embodiment of the present invention. As shown in FIG. 1, the data storage device 100 of the present embodiment is electrically coupled to a host 200 and includes a voltage pull-up module 110 (optional), a charge storage device 120, a voltage pull-down module 130, a control unit 140, a volatile memory 150 and a non-volatile memory 160. The voltage pull-up module 110 is configured to receive an external voltage EP (e.g., 5V) provided by the host 200, pull up the voltage level of the received external voltage EP and generate a high voltage HV (e.g., 12V) accordingly. The charge storage device 120 is electrically coupled between the high voltage HV and a reference voltage REF. The voltage pull-down module 130 is configured to receive the high voltage HV, pull down the voltage level of the received high voltage HV and generate at least one low voltage accordingly. In the present embodiment, the voltage pull-down module 130 includes voltage pull-down circuits 132, 134, 136 and 138. The voltage pull-down circuits 132, 134, 136 and 138 are configured to generate low voltages V1 (e.g., 5V), V2 (e.g., 3.3V), V3 (e.g., 1.5V) and V4 (e.g., 1.2V) respectively. The control unit 140 is configured to receive the low voltages V1, V2, V3 and V4 and provide the received low voltages V1, V2, V3 and V4 as operating voltages of its internal components.

Specifically, the control unit 140 is configured to transfer at least one of the received low voltages V1, V2, V3 and V4 to the volatile memory 150 and the non-volatile memory 160. For example, the control unit 140 may transfer the low voltage V3 to the volatile memory 150 and transfer the low voltage V4 to the non-volatile memory 160, thereby providing the low voltages V3 and V4 as the operating voltages for the volatile memory 150 and the non-volatile memory 160 respectively.

In another embodiment, some of the low voltages V1, V2, V3 and V4 may be directly provided to the volatile memory 150 and the non-volatile memory 160 without via the control unit 140. For example, the low voltages V2 and V3 may be provided to the non-volatile memory 160 directly and the low voltage V3 may be provided to the volatile memory 150 directly. Because the control unit 140 is not involved in the transmission of the low voltages, the load and circuit size of the control unit 140 is reduced; however, it is understood that power management of the control unit 140 on the volatile memory 150 and the non-volatile memory 160 are moot accordingly.

The volatile memory 150 may be implemented by a dynamic random access memory (DRAM) or a static random access memory (SRAM). In another embodiment, the volatile memory 150 may be replaced by data buffers disposed inside the control unit 140. The present embodiment may have the advantage that the data accessing speed is fast and the cost is low; however, the disadvantage is that the data storage capacity is small. The non-volatile memory 160 may be implemented, for example, using a memory device having relatively long data retention such as flash memory, magnetoresistive RAM, phase-change memory or ferroelectric RAM.

In the present embodiment as shown in FIG. 1, the non-volatile memory 160 includes a data buffer area 162, a data storage area 164 and a spare block pool 168. In one preferred embodiment, the data storage area 164 includes a plurality of first type of blocks (not shown) and each memory cell in each of the first type of blocks is configured to store M-bit data. The data buffer area 162 includes a plurality of second type of blocks (not shown) and each memory cell in each of the second type of blocks is configured to store N-bit data. In the present embodiment, the aforementioned M and N are positive integers, and N is smaller than M. The data buffer area 162 is for buffering data and has a relatively quick data accessing capability for temporarily storing data from the host 200. In one embodiment, the spare block pool 168 includes a plurality of the first type of blocks that can be used to replace the first type of blocks in the data storage area 164. In another embodiment, the spare block pool 168 further includes a plurality of the second type of blocks that can be used to replace the second type of blocks in the data buffer area 162. When a power drop/loss event occurs, the control unit 140 flushes the data stored in the volatile memory 150 into the second type of blocks in the data buffer area 162 or flushes the data stored in the data buffer in the control unit 140 into the second type of blocks in the data buffer area 162.

In another embodiment, the non-volatile memory 160 may include the data buffer area 162, the data storage area 164, a data flush block 166 and the spare block pool 168. The functions of the data buffer area 162, the data storage area 164 and the spare block pool 168 of the present embodiment are the same as those of the previous embodiment. The data flush block 166 includes at least one one second type of block. Under normal operation, the data flush block 166 is configured to not provide any data buffering function; that is, the data from the host 200 is stored in the data buffer area 162 first. The control unit 140 accesses the data flush block 166 only in an emergency state; for example, when a power drop/loss event occurs, the control unit 140 flushes the data stored in the volatile memory 150 into the data flush block 166 or flushes the data stored in the data buffer in the control unit 140 into data flush block 166.

In one embodiment, the first type of blocks is implemented by a triple-level cell (TLC) type of flash memory and a portion of the first type of blocks are configured to be multi-level cell (MLC) type of flash memory (or, switched to the MLC mode) or a single-level cell (SLC) type of flash memory (or, switched to the SLC mode) by utilizing software; where the MLC type of flash memory or the SLC type of flash memory configured from the TLC type of flash memory is referred to as the second type of blocks. In another embodiment, the non-volatile memory 160 is implemented by a MLC type of flash memory and a portion of the first type of blocks are configured to be SLC type of flash memory (or, switched to the SLC mode) by utilizing software; where the SLC type of flash memory configured from the MLC type of flash memory is referred to as the second type of blocks. In still another embodiment, the first type of block is implemented by a TLC type of flash memory and the second type of block is implemented by a SLC type of flash memory. In yet another embodiment, the first type of block is implemented by a MLC type of flash memory and the second type of block is implemented by a SLC type of flash memory.

Please refer to FIG. 1 again. In the present embodiment, the control unit 140 is electrically coupled to the host 200 via a communication interface 170 and configured to communicate with and transmit data to the host 200 via the communication interface 170. The communication interface 170 may be implemented by a serial advanced technology attachment (SATA), a serial attached SCSI (SAS), a peripheral component interconnect express (PCI-E), a universal serial bus (USB), a U.2 (formerly known as small form factor SFF-8639) interface, a mini SATA (mSATA).

In addition to communication with the host 200 via the communication interface 170, the control unit 140 further can communicate with the host 200 via a general purpose input/output (GPIO) pin 142 so as to transmit data to or receive data from the host 200 via the GPIO pin 142. The GPIO pin 142 preferably is one of the function reservation pins of the communication interface 170, so that the communication interface 170 does not require a physical change; and of course, the GPIO pin 142 may be a pin independent of the communication interface 170. The data transmitted or received by the GPIO pin 142 is preferably an interrupt message or a busy signal. In general, the host 200 includes basic input/output system (BIOS; not shown), a chipset 202, a central processor (not shown) and peripheral electronic components (not shown). The chipset 202 may include Northbridge (not shown) and Southbridge chips (not shown), or a single chip incorporating Northbridge and Southbridge. The host 200 may transmit the interrupt message to the control unit 140 via the GPIO pin 142. For example, when the power switch of the host 200 is switched on or the reset switch of the host 200 is pressed to reset the host 200, the BIOS outputs an interrupt signal to the chipset 202. When detecting the interrupt signal from the BIOS, the chipset 202 of the host 200 transmits the interrupt message to the control unit 140 via the GPIO pin 142. In addition, the host 200 executes a shutdown or system reset procedure after a preset time, for example, 2 seconds.

Figure 2:
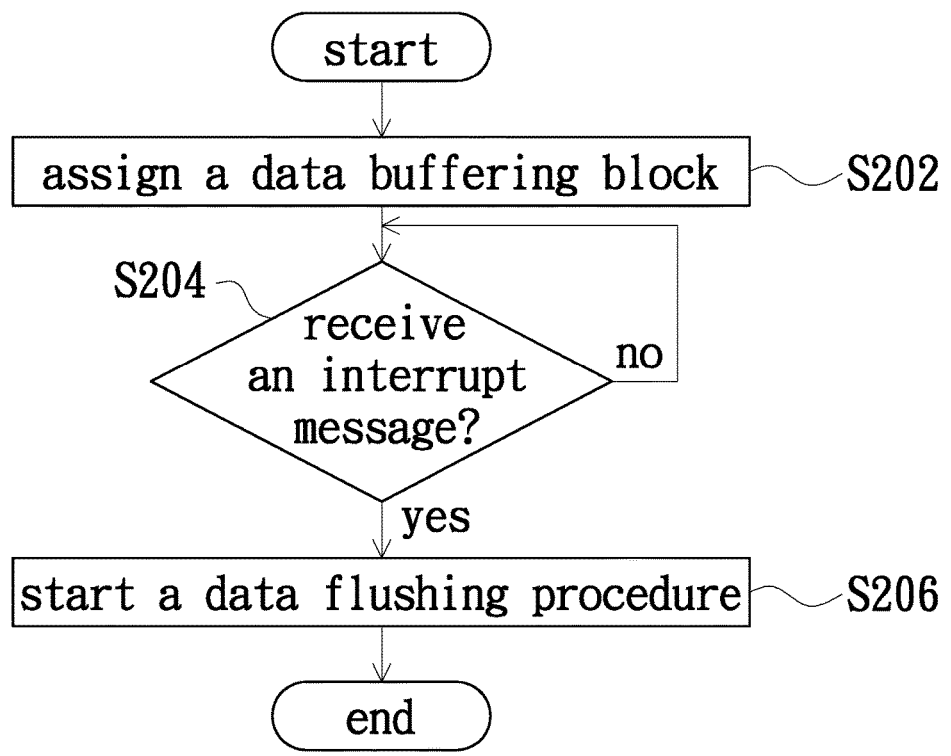
FIG. 2 is a flow chart of a data storage method in accordance with an embodiment of the present invention.

On the other hand, the data storage device 100 executes a data storage method of the present invention after the system initialization is completed. FIG. 2 is a flow chart of a data storage method in accordance with an embodiment of the present invention. First, step S202: assigning a data buffering block. For example, the second type of block in the data flush block 166 or the second type of blocks in the data buffer area 162 is assigned as the data buffering block in advance. Thereafter, step S204: configuring the control unit 140 to determine whether receiving an interrupt message from the outside, for example, the host 200. Step S206 is performed if the determination result of step S204 is YES. Thereafter, step S206: configuring the control unit 140 to start a data flushing procedure immediately when the control unit 140 receives the interrupt message (that is, the determination result of Step S204 is YES). Specifically, the control unit 140 copies or moves the data stored in the volatile memory 150 or the internal data buffers in the control unit 140 to the second type of block in the data flush block 166 (preferred) or the second type of blocks in the data buffer area 162. In addition, the data flushing procedure may be a series of data write commands or data flush commands that causes the data stored in the volatile memory 150 (DRAM or SRAM) or the data buffers in the control unit 140 to be written into the second type of block in the data flush block 166 or the second type of blocks in the data buffer area 162. The data flushing procedure preferably has the highest or the higher execution priority so that the data can be written into the data flush block 166 or in the data buffer area 162 at the fastest speed or within a preset time, thereby achieving the purpose of the data storage method of the present invention.

Figure 3:
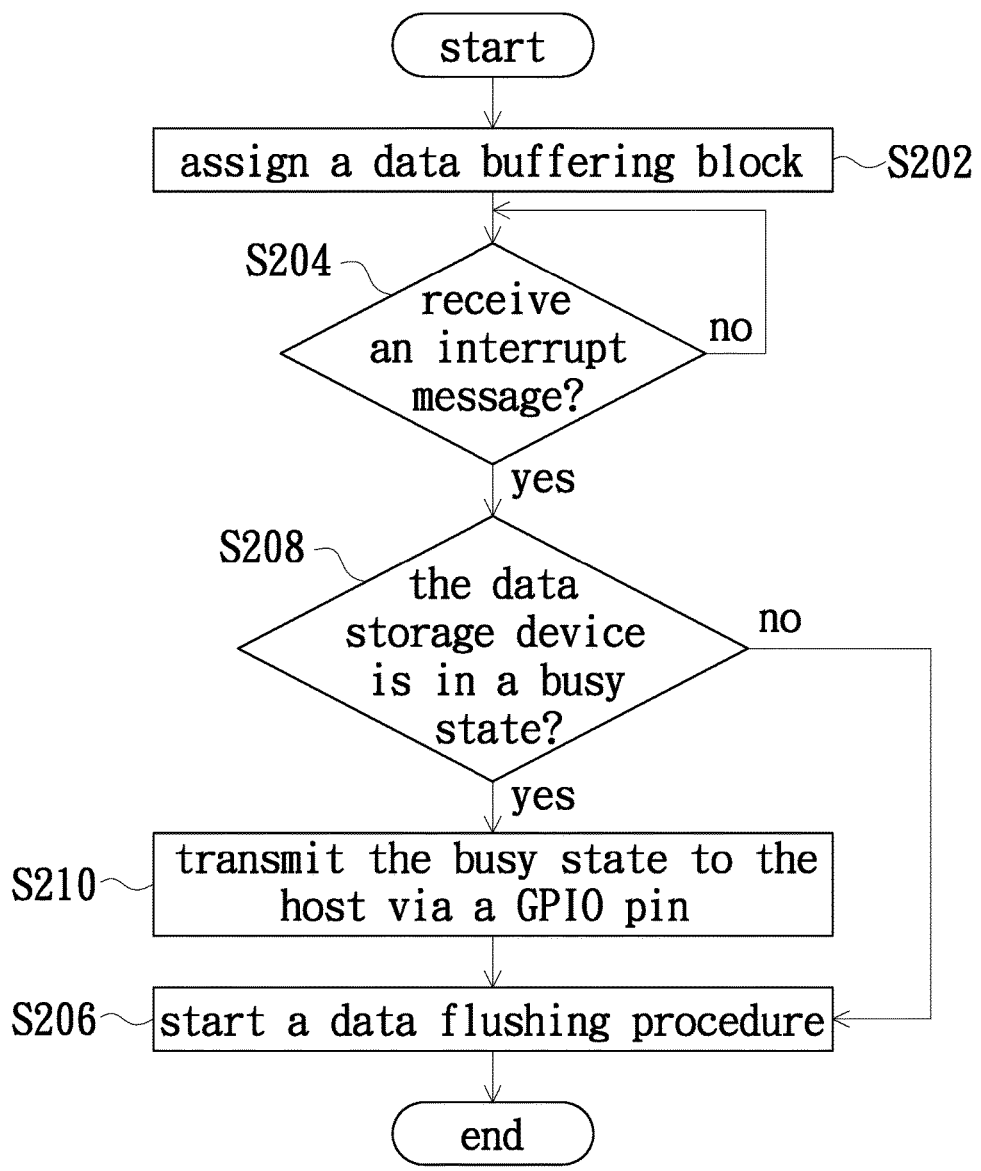
FIG. 3 is a data storage method in accordance with another embodiment of the present invention.

FIG. 3 is a data storage method in accordance with another embodiment of the present invention. Step S208 is performed if the determination result of the step S204 is YES which indicates that the control unit 140 receives the interrupt message from the chipset 202. First, step S208: determining whether the control unit 140 (or the data storage device 100) is in a busy state. Step S210 is performed when the determination result of step S208 is YES which indicates that the control unit 140 is in a busy state due to that, for example, the control unit 140 is performing a wear leveling process or a garbage collection procedure. Thereafter, step S210: configuring the control unit 140 to transmit a busy signal to the chipset 202 via the GPIO pin 142 to indicate that the control unit 140 is in a busy state and must suspend the shutdown or system reset procedure. In addition, after the chipset 202 receives the busy signal, a warning message or a warning sound to the user may be displayed or issued by the display screen (not shown) or speaker (not shown) of the host 200. Step S206 is performed after the control unit 140 completes the wear average or garbage collection procedure, that is, the control unit 140 exits the busy state. Thereafter, step S206: executing the data flushing procedure. Thus, the purpose of the data storage of the present invention is achieved.

Figure 4:
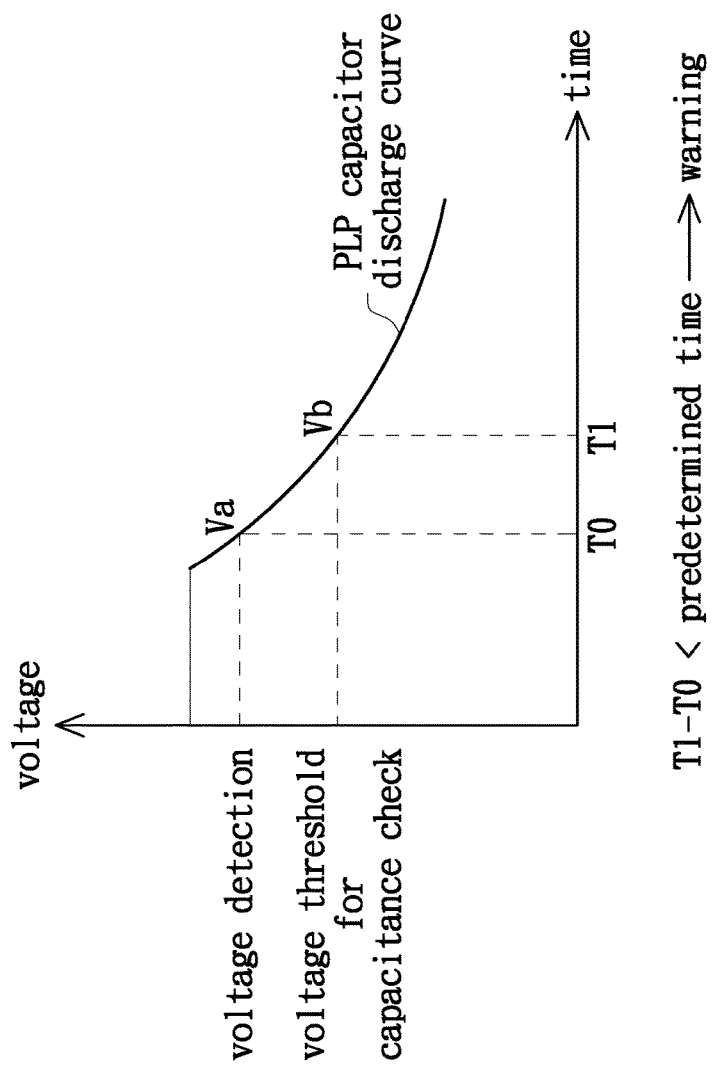
FIG. 4 is a schematic plot of a PLP capacitance discharge curve.

Due to the differences in hardware or software design, when the power switch of the host 200 is switched on or the reset switch is pressed to reset the host 200, the host 200 may immediately execute a shutdown or system reset procedure instead of waiting for a preset time and then executing shutdown or system reset procedure. Therefore, the control unit 140 may further include a voltage detection unit 144 as shown in FIG. 1. In generally, when operating normally, the charge storage device 120 has a power loss protection (PLP) capacitor discharge curve as shown in FIG. 4. The voltage detection unit 144 is configured to detect and record the voltage level of the charge storage device 120 so that the control unit 140 can determine whether the charge storage device 120 is operating normally according to the recording.

Figure 5:
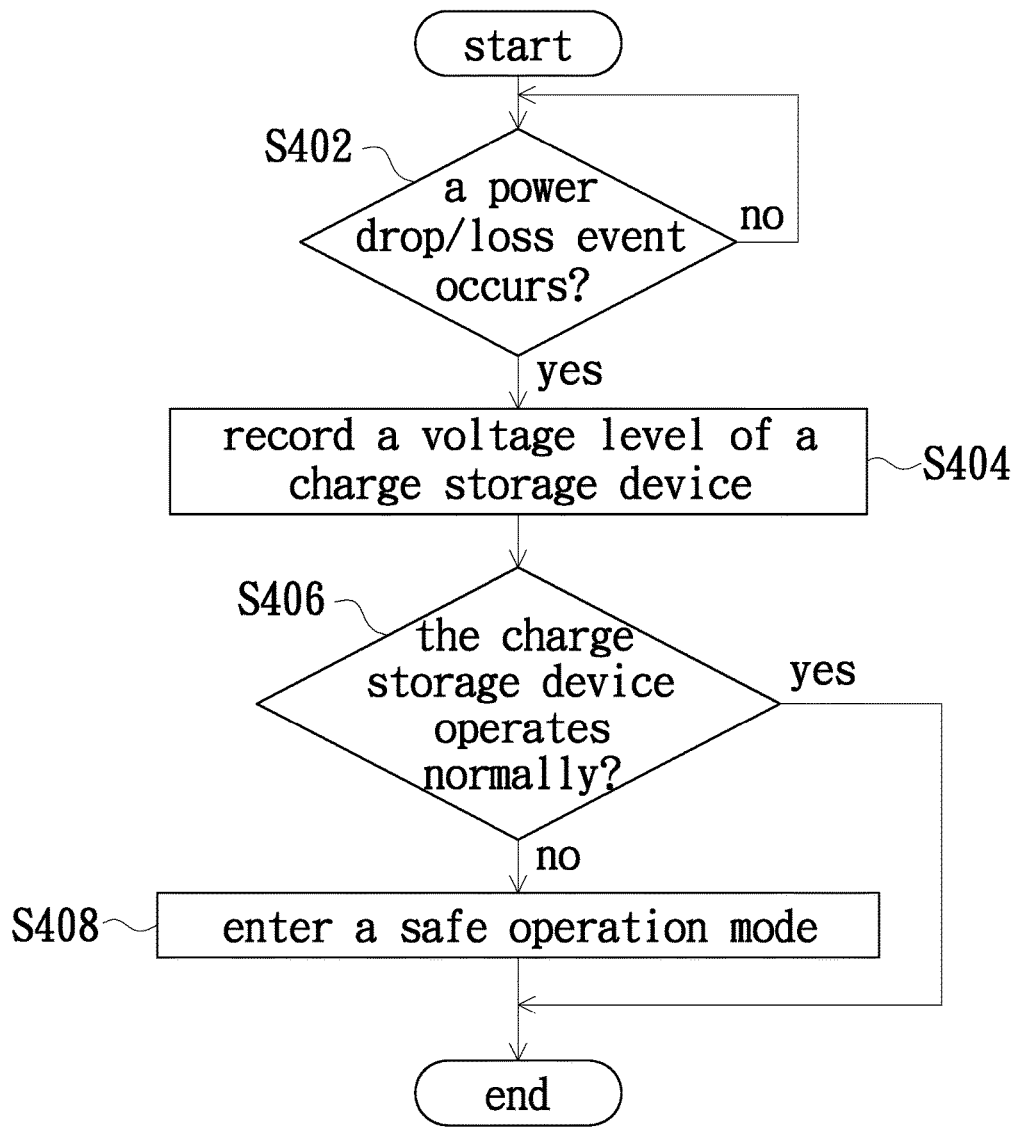
FIG. 5 is a data storage method in accordance with still another embodiment of the present invention.

FIG. 5 is a data storage method in accordance with still another embodiment of the present invention. First, step S402: determining whether a power drop/loss event occurs. Specifically, when the external power supply EP is dropped or lost (at this time, the determination result of step S402 is YES), the charge storage device 120 may mainly provide the control unit 140, the volatile memory 150 and the non-volatile memory 160 with the required operating voltages. Thereafter, step S404: recording the voltage level of the charge storage device 120. Specifically, if the charge storage device 120 is not damaged, the voltage level of the charge storage device 120 may drop from Va (a predetermined voltage level when the voltage detection unit 144 starts the voltage drop-down detection in FIG. 4) to Vb (a threshold voltage in FIG. 4) within 100 ms (the time difference between T1 and T0) with an error tolerance of 10 ms. Alternatively, if the charge storage device 120 is damaged or cannot operate normally, the voltage level of the charge storage device 120 may drop from Va to Vb within less than the lower limit of 90 ms, for example, only 50 ms. Or the voltage level of the charge storage device 120 may drop to be lower than Vb in the time difference time T0 and T1.

Thereafter, step S406: determining whether the charge storage device 120 can operate normally. Step S408 is performed if the determination result of step S406 is NO. Thereafter, step S408: configuring the control unit 140 to enter a safe operation mode. Specifically, when determining that the charge storage device 120 is damaged or cannot operate normally according to the voltage level of the charge storage device 120 recorded at the step S404 (at this time, the determination result of step S406 is NO), the control unit 140 transmits a backup power supply damage message to the host 200 via the GPIO pin 142 or a function reservation pin defined in the communication interface 170, and the controls unit 140 also enters into the safe operation mode from a normal operation mode.

In one embodiment, the safe operation mode may be a write caching free mode. Specifically, in the write caching free mode, the control unit 140 always writes the data from the host 200 into the second type of blocks in the data buffer area 162 directly and not stored into the volatile memory 150 temporarily. Although the system performance of the data storage device 100 is relatively low in the write caching free mode, it is ensured that that all the data from the host 200 is stored in the data buffer area 162.

In another embodiment, the safe operation mode may be a hybrid write caching mode. Specifically, in the hybrid write caching mode, the control unit 140 limits the data storage capacity of the volatile memory 150, for example, limits the data storage capacity to half the original or only one block in volume. When a power drop/loss event occurs, the control unit 140 can still copy or move the data stored in the volatile memory 150 to the data flush block 166 (preferred) or block(s) in the data buffer area 162 within a limited time and resources.

In still another embodiment, the safe operation mode may be a write through mode. Specifically, in the write through mode, the control unit 140 simultaneously writes the data from the host 200 into the second type of blocks in the data buffer area 162 and the volatile memory 150. As a result, the data storage device 100 can provide high-speed data accessing speed while ensuring that the data from the host 200 is stored in the data buffering area 162.

In another embodiment, the data storage method shown in FIG. 5 may further include a step (not shown): providing a debug log. The control unit 140 may provide the debug log to the host 200 via the communication interface 170 either actively or passively according to the request of the host 200. The debug log is preferably self-monitoring analysis and reporting technology (SMART) information, any information of software, hardware and event related to the control unit 140 or any information related to the charge storage device 120, so that the host 200 can determine that the backup power supply is damaged or nearly damaged from the debug log. The host 200 can display the result of the aforementioned determination to the user via its display screen so that the user can replace the backup power supply in time when the backup power supply is damaged or nearly damaged.

In summary, the data storage device of the present invention can ensure that data to be written into the data storage device is not lost when the power drop/loss event occurs, thereby ensuring the integrity and accuracy of the data to be written.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A data storage method for a data storage device, comprising steps of:
   determining whether a power drop/loss event occurs;
   when the power drop/loss event is determined to have occurred, recording a voltage level of a charge storage device, wherein the charge storage device provides power to the data storage device during the power drop/loss event;
   determining whether the charge storage device is operating normally according to the recorded voltage level of the charge storage device; and
   when the charge storage device is determined to be not operating normally, configuring the data storage device to enter a safe operation mode, wherein the safe operation mode comprises a write through mode;
   wherein in the write through mode a data from an external device is recorded into both a data buffer area and a volatile memory of the data storage device.

2. The data storage method according to claim 1, wherein when a time required for the voltage level of the charge storage device to drop from a predetermined voltage level to a voltage threshold is less than a lower error limit, the charge storage device is determined to be not operating normally.

3. The data storage method according to claim 1, further comprising a step of:
   when the charge storage device is determined to be not operating normally, transmitting a spare power damage message to a host via a general purpose input/output (GPIO) pin.

4. The data storage method according to claim 3, wherein the GPIO pin comprises a function reservation pin of a communication interface.

* * * * *